United States Patent [19]
Ausnit

[11] 4,235,653

[45] Nov. 25, 1980

[54] METHOD FOR MAKING RECLOSABLE BAGS

[75] Inventor: Steven Ausnit, New York, N.Y.

[73] Assignee: Minigrip, Inc., Orangeburg, N.Y.

[21] Appl. No.: 919,823

[22] Filed: Jun. 28, 1978

Related U.S. Application Data

[63] Continuation-in-part of Ser. No. 813,450, Jul. 7, 1977, abandoned.

[51] Int. Cl.[2] .......................... A65D 33/24; B32B 7/06

[52] U.S. Cl. .................................... 156/91; 24/201 C; 156/196; 156/227; 156/244.13; 156/244.15; 156/244.18; 156/250; 156/254; 222/92; 229/17 G; 229/38

[58] Field of Search ...................... 156/91, 196, 244.13, 156/244.15, 227, 250, 254, 244.18; 24/201 C; 150/3; 222/92; 229/17 G, 38

[56] References Cited

U.S. PATENT DOCUMENTS

| | | | |
|---|---|---|---|
| 3,198,228 | 8/1965 | Naito | 156/92 |
| 3,380,481 | 4/1968 | Kraus | 24/201 C |
| 3,543,379 | 12/1970 | Naito | 156/92 |
| 3,746,215 | 7/1973 | Ausnit et al. | 222/92 |
| 3,991,801 | 11/1976 | Ausnit | 24/201 C |

*Primary Examiner*—Caleb Weston
*Attorney, Agent, or Firm*—Hill, Van Santen, Steadman, Chiara & Simpson

[57] ABSTRACT

A thin wall extruded flexible web is provided with laterally spaced longitudinally extending complementary resiliently flexible interlocking fastener profiles having an imperforate gusset forming web area therebetween which is collapsibly folded into a gusset extending in one direction away from the profiles. Portions of the plastic web are folded into free terminal digitally manipulatable bag mouth pull flanges projecting to a suitable length in the opposite direction from the profiles, with the remainder of the plastic web being collapsed toward the gusset into bag forming side wall panels and extending to a substantially greater length than the gusset for providing a substantial bag pouch into which the gusset projects only a limited extent, with the fastener profiles being then secured together into interlocking but releasable fastener relation. Several embodiments of the method are disclosed. Apparatus for practicing the method is disclosed.

17 Claims, 25 Drawing Figures

Fig. 2
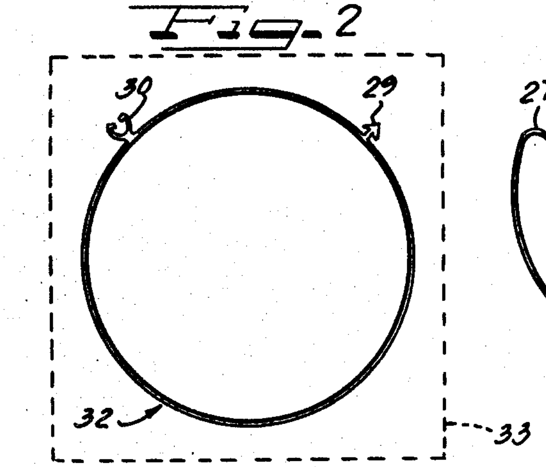
Fig. 3
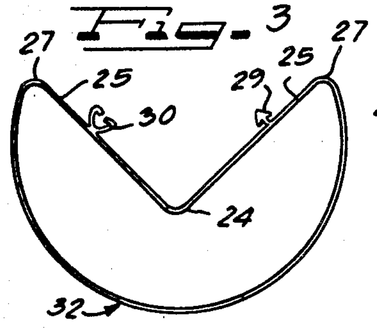
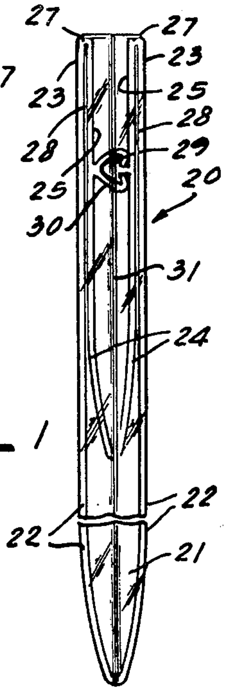
Fig. 1
Fig. 4
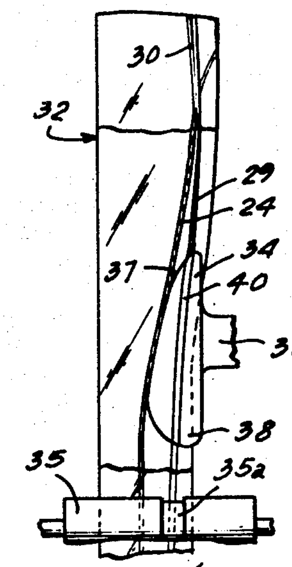
Fig. 5
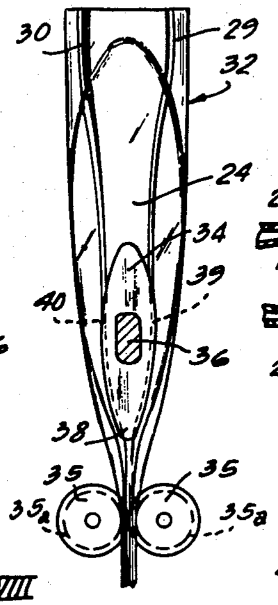
Fig. 6
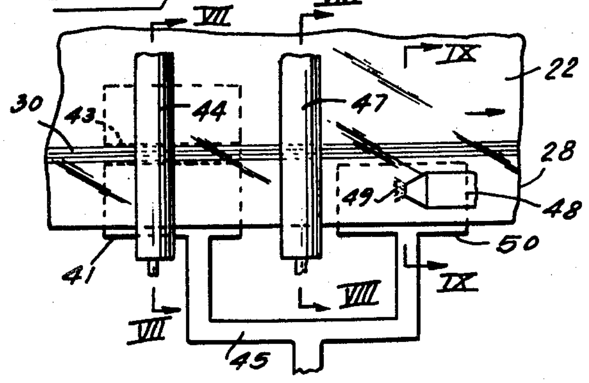
Fig. 7
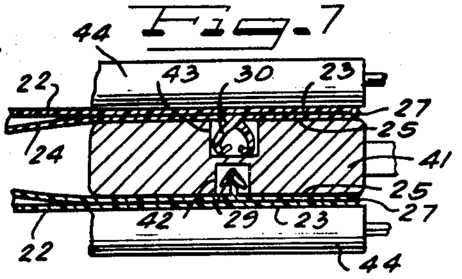
Fig. 8
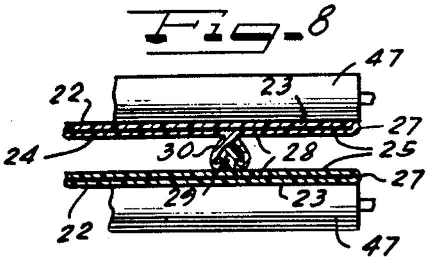
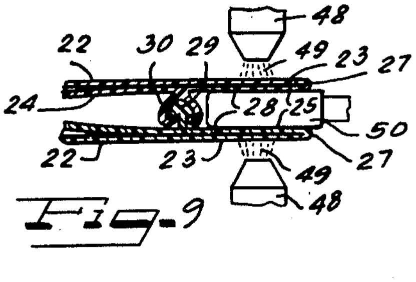
Fig. 9

METHOD FOR MAKING RECLOSABLE BAGS

RELATED APPLICATION

This is a continuation-in-part of my copending application Ser. No. 813,450 filed July 7, 1977, now abandoned.

BACKGROUND OF THE INVENTION

This invention relates to improvements in method for making reclosable bags, and is more particularly concerned with a method especially suitable for making reclosable bags from one piece integral extrusions, and which are adapted to be initially hermetically sealed and after being opened are reclosable by means of integral separable fasteners.

A wide variety of products from foodstuffs to hardware and materials in liquid or granular form are desirably packaged in flexible plastic bags which may or may not be transparent or at least translucent. With certain types of packaged contents, it is desirable to provide means preventing unauthorized access to the contents or to prevent spillage. Often the contents must remain hermetically sealed until used. With pourable contents, whether liquid or particulate, it is often desirable to have the bags equipped with pouring spout means. A type of bag which is especially suitable for these purposes is disclosed in U.S. Pat. No. 3,746,215. However, the bags disclosed therein are constructed from a plurality of separately formed parts secured together. That complicates and increases cost of manufacture because of the multi-part fabrication and the necessary assembling and securing together of the parts.

A principal aim of the present invention is to provide a new and improved, simplified, efficient method by which the bags can be produced in one integral extruded piece. Tubular extrusions for manufacture of bags are disclosed, for example, in U.S. Pat. Nos. 3,246,672, Re. 29,208, and 3,380,481. Although those patents disclose the integral extrusion of separable zipper-type resiliently flexible fasteners, they fail to have any provision for a combination closure and hermetic sealing gusset means which may, if desired also provide pouring spout means.

SUMMARY OF THE INVENTION

It is, accordingly, an important object of the present invention to provide a new and improved method for making integral extruded construction for reclosable bags in which by means of a single one piece extrusion not only the bag pouch body and separable fastener means are provided but also an integral infolded hermetic sealing gusset which gusset may also serve as a pouring spout after the bag is opened.

Another object of the invention is to provide a new and improved method for making integral extruded bag construction which contains in one integral part all of the elements needed for a complete specialized bag structure.

A further object of the invention is to provide a new and improved method of making an integral extruded construction for bags.

Still another object of the invention is to provide a new and improved method of making special type reclosable bags.

Yet another object of the invention is to provide a new and improved method for making one piece extruded plastic reclosable bags.

According to an important embodiment of the invention, there is provided a method of making an integral extruded plastic bag, comprising forming a thin wall extruded flexible plastic web, providing integrally on the plastic web longitudinally extending and laterally spaced complementary resiliently flexible interlocking fastener profiles having an imperforate gusset-forming web area therebetween, collapsibly folding the gusset-forming web area into a gusset extending in one direction away from said profiles, folding portions of the plastic web into free terminal digitally manipulatable bag mouth pull flanges projecting to a suitable length in the opposite direction from said profiles, collapsing the remainder of the plastic web toward said gusset into bag pouch side wall panels to extend to a substantially greater length than the gusset for providing a substantial bag pouch into which the gusset projects only a limited distance, and securing the fastener profiles together into interlocking but releasable fastener relation, whereby the gusset provides a security closure for the bag which closure is adapted to be broken for discharging contents from the bag and the separable fastener profiles being then adapted for reclosing the bag.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

BRIEF DESCRIPTION OF THE DRAWINGS

FIG. 1 is a fragmentary vertical end elevational view of an extruded one-piece plastic bag embodying features of the present invention.

FIG. 2 is a schematic illustration of a method of and means for extruding an integral extruded construction or section for bags according to the invention and in this instance comprising a tubular extrusion.

FIG. 3 demonstrates the extrusion of FIG. 2 partially folded.

FIGS. 4 and 5 are schematic illustrations of one method of and means for effecting folding of the extrusion.

FIG. 6 is a fragmentary schematic top plan view of another part of apparatus for making bags according to the present invention.

FIG. 7 is a fragmentary sectional detail view taken substantially along the line VII—VII of FIG. 6.

FIG. 8 is a fragmentary sectional detail view taken substantially along the line VIII—VIII of FIG. 6.

FIG. 9 is a fragmentary sectional detail view taken substantially along the line IX—IX of FIG. 6.

DESCRIPTION OF PREFERRED EMBODIMENTS

Figure 10:
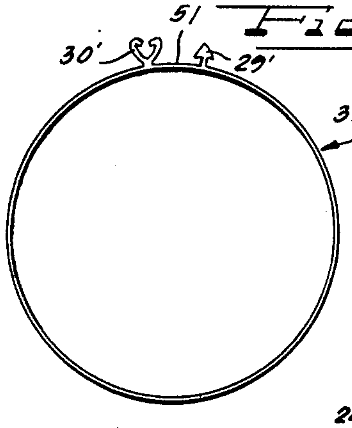
FIG. 10 is an end elevational view of a modified form of the bag extrusion.

On reference to FIG. 1, one form of one piece extruded plastic bag 20 made according to the method of the invention is depicted comprising a pouch body 21 having coextensive opposite side wall panels 22. Integrally connected with upper mouth end portions 23 of the side wall panels 22 is an inturned security closure gusset 24 having upper end portions 25 which are integrally joined with the upper mouth end portions 23 of the side wall panels along integral fold junctures 27. The gusset wall portions 25 and the side panel portions 23 are of adequate width to provide double thickness flanges 28 at each side of the mouth of the bag and adapted for manipulation to open the bag mouth when desired.

Formed integrally with the bag extrusion, and in this instance integrally on the confronting surfaces of the walls of the gusset 24 at the lower sides of the flange portions 25 are separable fastener means comprising complementary resilient zipper-type fastener profiles comprising a male profile 29 on one side and a female profile 30 on the other side. The profiles 29 and 30 are of any desired form, in this instance comprising a generally arrowhead shaped form for the male profile 29 having opposite lateral shoulders therealong, and a complementary undercut side hook groove recessed form for the female profile 30. Thereby the profiles are adapted to interengage in a locking relation by pushing them together and are adapted to be separated by pulling laterally apart on the manipulatable mouth end pull flanges 28.

As shown, the gusset 24 extends as a generally infolded extension into the bag body 21 extending from the mouth end of the bag and provides an initial closure which may be a hermetic security seal and which is adapted to be punctured or otherwise opened when desired to gain access to contents sealed within the pouch of the bag. In this instance, the gusset 24 is of a length to serve as a pouring spout funnel by reversion of the gusset when the fastener 29,30 is open, for discharge of contents from the bag.

Filling of the bag 20 may be effected in any desired manner, either by inserting contents from one side of the bag before such one side is sealed closed, or by having the lower end of the bag initially open, or slit open for filling the bag from the bottom and then sealing the bottom end of the bag to provide a fully closed bag enclosing the contents. It will be understood that by having the plastic material of the bag of a heat sealable thermoplastic type, as is customary, bags can be produced in continuous succession from a continuous extrusion. Although in the finished bag 20 the laminar wall areas 23 and 25 will be held reasonably close together by the thermally sealed bag side edge seams 31, assurance of laminar integrity may be attained by thermally securing the areas 23 and 25 together to form the flanges 28.

As represented in FIG. 2, an integral extrusion construction 32 for making a succession of the bags 20 is adapted to be formed by extrusion of suitable thermoplastic material, utilizing any preferred extrusion process and equipment, which may conveniently be substantially according to that disclosed in U.S. Pat. Re. 29,208, the disclosure of which is embodied herein by reference to any extent necessary. According to that patent, extrudate is forced from an extruder, schematically identified at 33 through a suitable annular or other geometric form of die opening to provide a thin wall extruded flexible plastic web which, as shown, may be tubular but may also be formed with symmetrically disposed unjoined edges in a flat sheet or strip or other geometric shape wherein the thin wall film or web character of the extruded product is adapted for producing bags 20 in whatever size desired. Where the extruded construction 32 is tubular as shown, the inside of the extruded tube is pressurized by means of air to keep it from collapsing and to obtain cross gain orientation of the material as the extruded shape is cooled and set for further handling. Formed integrally on the extruded web 32 are the longitudinally extending and suitably laterally spaced complementary resiliently flexible fastener profiles 29 and 30. As shown in FIG. 2, the profiles 29 and 30 are integrally attached in one piece to the outer face of the extruded web structure 32. In this instance the spacing between the profiles 29 and 30 is about one-fourth of the circumference of the tubular web 32.

After the extruded construction 32 has been cooled and set sufficiently to be easily handled, the gusset 24 is folded in and the fastener profiles 29,30 closed. By way of example, about one-third of the perimeter of the tubular construction 32 with the profiles 29 and 30 located symmetrically thereon may be folded inwardly as shown in FIG. 3. As will be observed the folding in is started at the fold points 27 sufficiently spaced from respectively the profiles 29 and 30 so that as folding in of the gusset 24 and collapsing of the remainder of the tubular section 32 progresses, the flange areas 25 at the outer sides of the gusset and the corresponding flange areas 23 of the bag side wall panels 22 will be automatically brought into contiguity.

One means for effecting tucking in of the gusset 24 and collapsing of the tubular construction 32 is depicted schematically in FIGS. 4 and 5. For this purpose, a gusset tucking-in head member 34 is located adjacently upstream relative to cooperating rotary pinch rolls 35 to effect progressive folding tucking in of the gusset 24 as the pinch rolls collapse and advance the bag-making one piece extruded web structure and fastener profiles 29,30. In keeping with its tucking-in function, the member 34 is fixedly supported by means of an arm 36 or the like extending from suitable frame structure (not shown) and has a suitably formed shape including a smoothly contoured tucking in edge 37. At its forward end the member 34 tapers to a relatively thin tip 38 consistent with the folded, collapsed condition of the bag section into which the tubular extrusion 32 is forced, by and between the nips of the pinch rolls 35. Along its opposite sides the tucking member 34 has respective longitudinally extending guide grooves 39 and 40 through which the profiles 29 and 30, respectively run during the tucking-in and collapsing operation. These guide grooves 39 and 40 assure that the fastener profiles 29 and 30 will remain in proper spaced opposed relation as the gusset 24 is being tucked in and after the substantially collapsed extrusion section leaves the tucking-in member 34 and passes on and through the pinch rolls 35 which have relief grooves 35*a* to clear the profiles.

After leaving the pinch rolls 35, the collapsed, tucked-in plastic section travels on through additional processing means depicted in FIGS. 6–9, desirably comprising a joining guide block 41 which is received within the tucked in gusset 24 and which has a guide groove 42 on one side through which the fastener profile 29 runs and a guide groove 43 parallel thereto on the opposite side through which the fastener profile 30 runs in the onward travel of the collapsed continuous plastic bag making section. The opposite sides of the guide member 41 are flat and parallel and guide rolls 44 maintain the laminar collapsed bag wall panels 22 and 23 and gusset walls 24 and 25 running in a laminar relation along the flat faces of the guide block member. Support for the guide block member 41 may be provided by means of a supporting frame bracket 45 mounted on the machine frame (not shown).

Downstream adjacent to the guide block 41, cooperating rotary joining rolls 47 press the laminar fastener profile carrying portions of the collapsed extruded section toward one another and snap the fastener profiles 29 and 30 into interlocking relation as viewed in FIG. 8, while maintaining the laminar structure in substantially parallel relation.

Adjacently downstream from the guide rolls 47 means are provided for heat sealing the laminar pull flange areas 23 and 25 together. In a desirable form such heat sealing means comprise hot air nozzles 48 which are directed to impinge hot air jet streams 49 against the outer areas 23 to soften and substantially fuse the areas 23 to the areas 25. The hot air may be supplied from any suitable source. Means which may also be supported by the bracket 45 and comprising an anvil block 50 is disposed between the on-running pull flanges 28 as they are being impinged by the hot air jet streams 49. Not only are the flanges 28 thereby held in proper, efficient, position to receive the hot jet streams 49 thereagainst, but by having the anvil 50 located between said flanges, the flanges are prevented from being sealed together. Also, by having the anvil 50, if desired of a good heat transfer material such as aluminum or the like, residual heat in the anvil derived from the jet streams acting on the flanges 28 will preheat the inner flange areas 25 to speed up the fusing action. In effecting the fusing, there need be only sufficient softening at the interface between the flange areas 23 and 25 to effect a reasonable bond so as to maintain the fused laminar relation of the flange areas from spreading open when the bags made from the extruded collapsed process section are filled. Beyond the fusing device 48,50, the completed collapsed extruded plastic bag making section is adapted to be further process as by transversely sealing and dividing the same into bag sections, filling the bag sections, and sealing either the side opening or bottom opening, as the case may be, after the bag sections have been filled.

Figure 11:
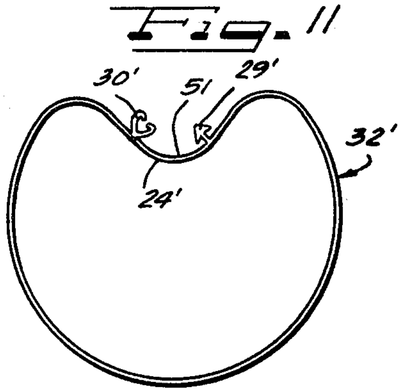
FIG. 11 is a view similar to FIG. 10 but showing the extrusion partially collapsed.
Figure 12:
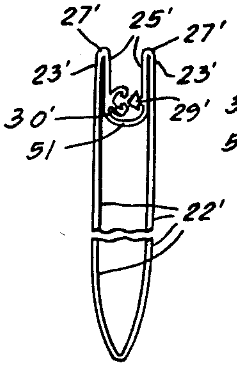
FIGS. 12 and 13 show the extrusion of FIGS. 10 and 11 further collapsed toward bag form.
Figure 13:
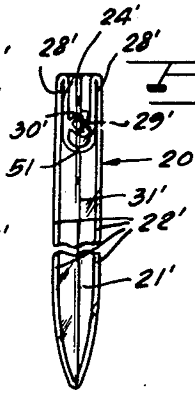
Figure 14:
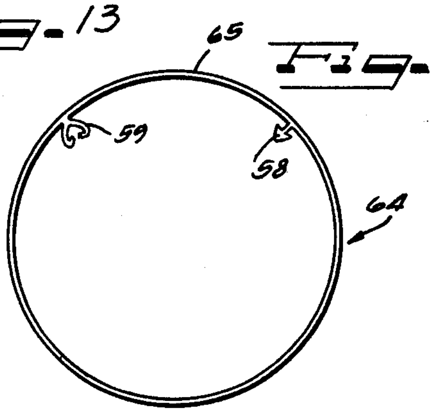
FIG. 14 is an end elevational view of another form of the extrusion for making bags according to the present invention.

In a plastic bag construction where the benefits to be derived from a one piece extruded pilfer-proof, sealed bags are desired without provision for a projectable pouring spout when the bag is opened, the construction depicted in FIGS. 10–13 may be adopted. In this construction the bag 20′ has the pouch portion 21′ with side wall panels 22′ and bag top mouth defining pull flanges 28′ formed by lamination of sections 23′ and 25′ and with the separable fastener profiles 29′ and 31′ integrally in one piece with and at the inside of the gusset 24′, similarly as the corresponding structure in the bag 20 in FIG. 1. However, instead of extending the gusset as a limited secondary pouch inwardly beyond the fastener 29′,30′, the inner end of the gusset 24′ terminates as an integral narrow hermetic sealing web 51 inwardly adjacent to the separable fastener. In use, the sealing web 51 may be completely severed after the separable fastener 29′,30′ has been opened, or the gusset web 51 may be only partially punctured to provide a pouring spout hole where the contents of the bag are susceptible of being dispensed in that manner. After the bag has been opened it is readily reclosed by reclosing the separable fastener 29′, 30′. In the method of making the bag 20′, substantially similar steps with substantially similar apparatus may be employed as in making the bag 20 of FIG. 1, with such modifications as will produce the structure of the bag 20′. As shown in FIG. 10, a one piece tubular extruded thin web construction 32′ having the fastener profiles 29′ and 30′ integrally in one piece therewith has the fastener profiles 29′ and 30′ located more closely together, leaving only the relatively narrow gusset area 51 therebetween. Nevertheless, when the gusset 24′ is tucked in as shown in FIG. 11, the connecting sealing area 51 and the profiles 29′ and 30′ are tucked down deep enough into the gusset 24′ to provide adequate length in the pull flanges 28′ as formation of the bag section progresses from the preliminary tucking indentation of the gusset 24′ as shown in FIG. 11 to the more advanced tucking in of the gusset and collapsing of the side wall panel portions 22′ as in FIG. 12. Completion of the bag section to the fully collapsed fastener closed and pull flange fused condition as represented in FIG. 13 may all be effected in similar manner with similar apparatus as described in connection with FIGS. 4–9, except that in the final formation only the narrow connecting sealing web 51 will be present at the inner side of the separable fastener 29′,30′. While FIG. 10 shows a tubular construction, a flat sheet or strip construction as shown in FIG. 18 can be used just as readily.

In another form as depicted in FIGS. 14–17, a one piece flexible plastic bag 52 is provided which has substantially the same attributes as the bags 20 and 20′ already described, except that instead of a resiliently flexible separable zipper-type fastener assembly 29′,30′ being formed integrally with a tucked in mouth end gusset 51 of the bag 20′, the separable fastener assembly is formed in the vicinity of and below, the gusset 54 but separate therefrom and on the inner sides of side wall panels 55 defining a pouch body 57 for the bag 52. As will be observed, a male fastener profile 58 is provided integrally in one piece on one of the side wall panels 55 and a complementary female fastener profile 59 is formed integrally in one piece on the other of the side wall panels 55. In this construction the inner end of the tucked in gusset 54 terminates adjacent to and above the fastener 58,59. However, similarly as in the previously described forms of the bag, adequate width mouth end flange portions 60 of the side wall panels 55 extend beyond the fastener 58,59 and join along integral junctures 61 with side panels 62 of the gusset 54 to provide pull flanges 63 at each side of the mouth of the bag. If preferred, the flange areas 60 and 62 may be fused, although if preferred, they may remain unfused so that after puncturing the gusset 54 to open the bag, the gusset may be projected as a pouring spout or funnel which is adapted to be tucked back into the bag mouth similarly as the funnel extension of the tucked in gusset 24 in FIG. 1 except that the gusset 54 extends inwardly toward the separable fastener 58,59 instead of the funnel portion of the gusset extending inwardly beyond the fastener 29,30 in FIG. 1.

Figure 15:
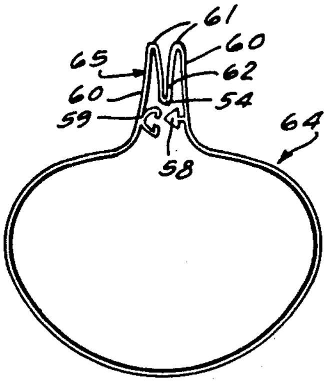
FIG. 15 shows the extrusion of FIG. 14 partially collapsed.
Figure 16:
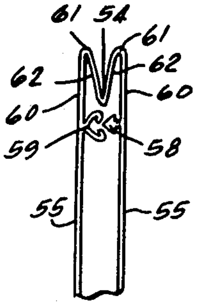
FIGS. 16 and 17 show the extrusion of FIGS. 14 and 15 further collapsed toward bag formation.
Figure 17:
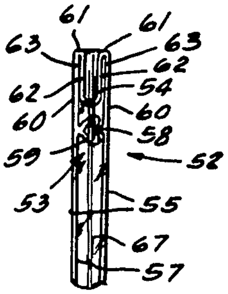

In making the bag 52, a one piece extruded thin plastic web and fastener profile structure 64 may be formed as shown by tubular extrusion or if so desired by flat sheet extrusion with the fastener profiles 58 and 59 suitably spaced apart to provide suitable area 65 of the extruded web between the profiles 58 and 59 to provide the gusset 54 and the pull flanges 63 in the completed bag. As shown in FIG. 15, the area 65 is adapted to be collapsed with the gusset 54 tucked in between the flanges areas 60 and the profiles 58 and 59 brought into alignment adjacent to the inner end of the gusset 54. Then the remainder of the extrusion 64 is adapted to be collapsed to provide the wall panels 55. After the fastener profiles 58 and 59 have been snapped into interlocking relation, the panel areas forming the pull flanges 63 may be fused if desired, although they may be left unfused if it is desired to have a projectable pouring spout funnel arrangement. After the one piece extruded bag section has been completed, it may be sealed and separated along transverse lines 67 to provide sealed bag sides and the bags filled in any preferred manner either while one side is still open or by slitting the bottom ends of the bag and filling them from the bottom ends and then sealing up the bottom ends.

Figure 18:
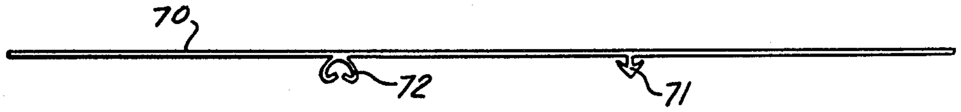
FIG. 18 is an end elevational view of an integral extruded construction or section for bags according to the invention and in this instance comprising an open ended or flat extrusion having the fastener profiles integral therewith.
Figure 19:
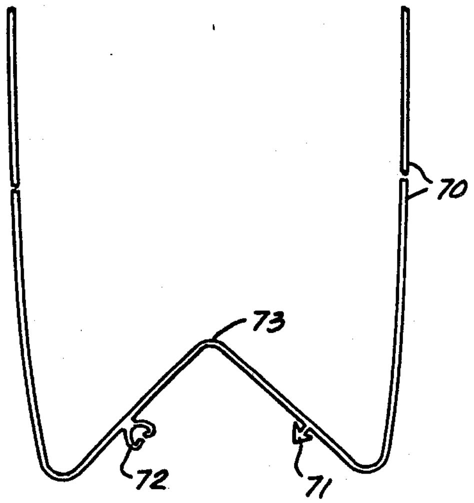
FIG. 19 demonstrates the extrusion of FIG. 18 partially folded.
Figure 20:
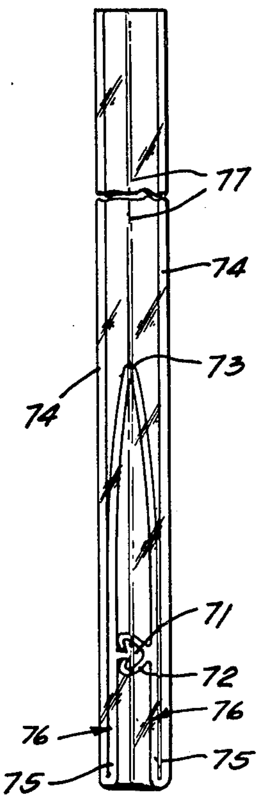
FIG. 20 shows the extrusion of FIGS. 18 and 19 collapsed and the fastener profiles interlocked.

FIGS. 18–20 depict an arrangement wherein a one piece flat thin extruded plastic web 70, of adequate width to provide the size bags desired, is provided with an integral male separable fastener profile 71 and a complementary female fastener profile 72, the profiles being spaced adequately apart to permit, as shown in FIG. 19, folding of the area between the profiles 71 and 72 into a gusset 73. When the profiles 71 and 72 are brought together as shown in FIG. 20 into interlocked fastener relationship, the gusset 73 extends inwardly between bag wall panels 74, and substantial width areas of the panels 74 and flange portions 75 which project outwardly from the profiles 71 and 72 cooperate to provide laminar pull flanges 76. With this form of construction, after the continuous strip has been folded up as shown in FIG. 20, and sealed along transverse lines 77 to provide a bag section, contents may be loaded into the bag section through the open end where the free ends of the original plastic sheet have been brought together but left unsealed until the contents have been loaded into the bag. Thereafter the open bottom end of the bag is adapted to be sealed closed in well-known manner to confine the contents securely within the sealed bag.

Figure 21:
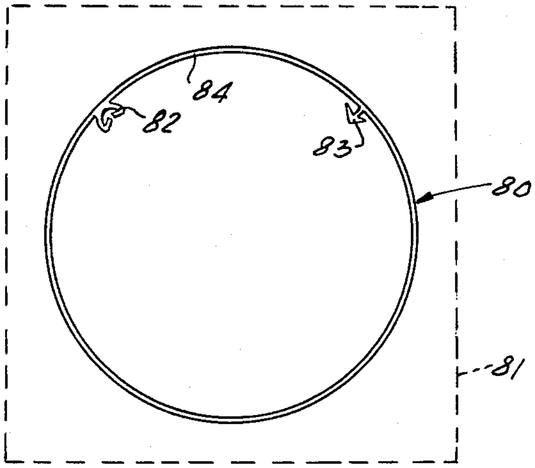
FIG. 21 is a schematic illustration exhibiting another method of and means for extruding an integral extruded construction or section for bags according to the principles of the present invention and in this instance comprising a tubular extrusion.
Figure 22:
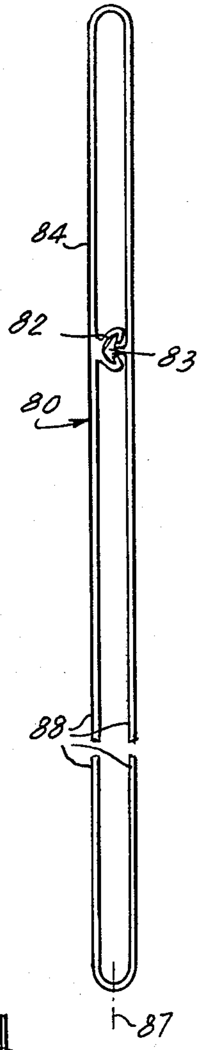
FIG. 22 is a fragmental end view of the extrusion of FIG. 21 partially folded.
Figure 23:
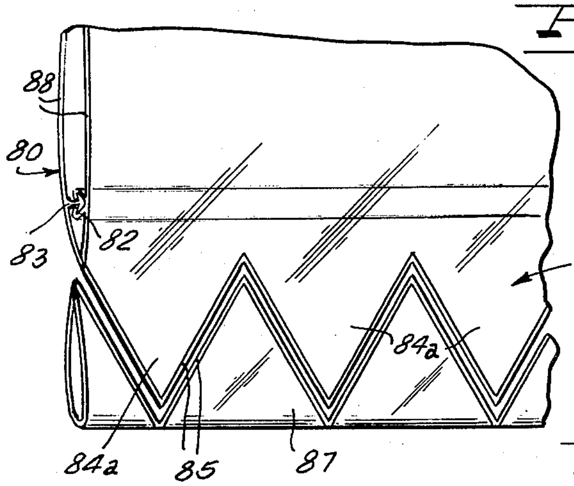
FIG. 23 is an elevational view showing how the gusset portion of the collapsed extrusion of FIG. 22 is adapted to be shaped to provide funnel shape pouring spout gusset means.
Figure 25:
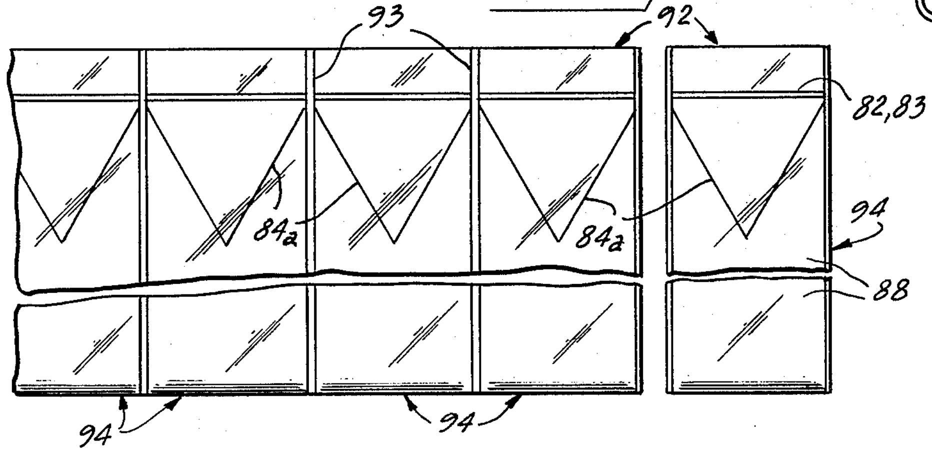
FIG. 25 shows how the extrusion after all parts thereof have been folded into position is adapted to be separated into individual bag sections.

As shown in FIG. 21, an integral extrusion construction 80 for making reclosable bags is adapted to be formed by extruding suitable thermosplastic material from an extruder 81 which has for this purpose an annular or other geometric form of die opening to provide a suitably thin wall extruded flexible plastic web which, as shown, may be tubular but may also be formed with symmetrically disposed unjoined edges in flat sheet or strip or other geometric shape wherein the thin wall film or web characteristics of the extruded product is adapted for producing bags of whatever size desired. Where, as shown, the extruded web 80 is tubular, the inside of the extruded tube is pressurized by means of air to keep it from collapsing and to obtain cross grain orientation of the material as the extruded shape is cooled and set for further handling. Formed integrally on the extruded web 80 are longitudinally extending and suitably laterally spaced complementary resiliently flexible fastener profiles 82 and 83 comprising a female profile and a male profile, respectively. These profiles 82 and 83 are integrally attached in one piece to the inner surface of the extruded web 80. In this instance the profiles 82 and 83 are spaced apart in such a manner as to provide a relatively narrow gusset-forming area 84 of about one fourth the circumference of the tube between the profiles 82 and 83 at one of their sides, and the remaining major portion of the tube circumference extending between the opposite sides of the profiles. The extruded web 80 is then adapted to be collapsed as shown in FIG. 22 to secure the fastener profiles 82 and 83 into interlocking but releasable fastener relation and wherein the gusset forming area is collapsed into a gusset which extends in one direction from the fastener, whereas the remainder of the collapsed extrusion projects in the opposite direction from the fastener profiles. The collapsed extrusion can be wound in a roll for subsequent feeding into a bag making machine, to bag filling apparatus, or the extrusion can be delivered as a continuous process to a bag making machine.

Where it is desired to use the gusset 84 as a pouring funnel, the gusset forming web area may be shaped as shown in FIG. 23, comprising heat sealing the area along a generally zig-zag heat seal 85 longitudinally therealong, whereby respective generally triangular funnel elements 84*a* are formed and the remainder of the area is separated as scrap 87. Such funnel element forming may be effected in the bag making machine or before the extrusion goes to the bag making machine.

Figure 24:
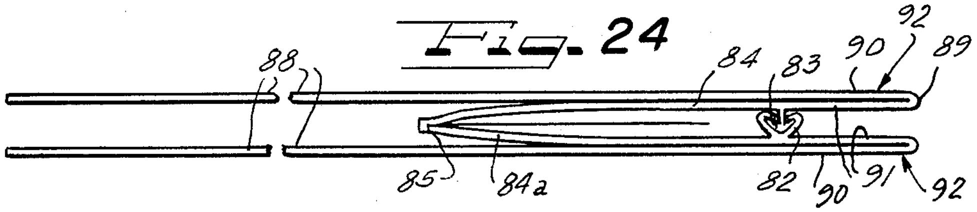
FIG. 24 is a fragmental end view of the extrusion after the wall panel portions of the extrusion web have been folded into bag pouch orientation.

Before or after forming the area 84 into funnel elements 84*a*, the one piece plastic extrusion is slit along a line 87 (FIG. 22) at the lower end of the major extent of the collapsed extrusion, that is that portion of the extrusion which extends in the opposite direction from the gusset 84, having regard to the fastener 82,83. This divides the major extent portion of the extrusion into bag pouch side wall panels 88. Then, as shown in FIG. 24, the side wall panels 88 are folded over along fold lines 89 suitably spaced from the profiles 82,83 into collapsed relation onto the gusset 84 and to extend to a substantial extent beyond the tip of the gusset whereby to provide a substantial contents receiving pouch. Between the integral fold line junctures 89 and the respective fastener profiles 82 and 83, upper mouth end portions 90 of the side wall panels 88 and walls portions 91 joined to the respective fastener profiles are brought into substantially laminar relation to form double thickness pull flanges 92 adapted for manipulation to open the bag mouth when desired. That is to pull open the fastener profiles 82 and 83 when it is desired to expose the gusset 84. By preference, the laminar flange portions 90 and 91 are heat sealed or fused such as in the manner described in connection with FIG. 9, so that in a filled bag, the pull flanges 92 will retain their integrity. In the final steps in bag formation, what has up to this point been a substantially continuous collapsed and folded strip is fusion sealed along transverse parallel lines between the gusset funnel elements 84*a* whereby to provide individual bag sections 94 which are separable along the seals 93. Before, or after separation into bag sections 94, the bags may be filled with contents, as for example through open ends of the bag pouch portions and the open ends thereafter, hermetically sealed, which together with the side seals and the integral gussets 84, whether in the form of the funnel elements 84*a* or not, provide complete hermetic sealing of the contents within the bags.

To gain access to contents within the bags 94, the pull flanges 92 may be pulled apart to separate the fastener profiles 82 and 83 to gain access to the bag gusset 84 which may be punctured to permit pouring of the contents as by extending the gusset outwardly between the separated profiles 82 and 83. Where the gusset is in the form of the funnel element 84*a*, the funnel element may be extended and the tips snipped off to any desired extent, depending on how large a pouring spout opening is desired. After as much of the contents have been dispensed as desired, the gusset is returned into the bag pouch, and the fastener profiles 82 and 83 pushed together into closing relation. In an especially desirable form, the fastener profiles 82 and 83 may be constructed substantially as taught in U.S. Pat. Re. 28,969, wherein the male profile 83 is of the generally arrowhead shape configuration having oppositely extending generally hook-shaped head portions, and the female profile 82 is of complementary grooved shape to receive the male profile in a snap-in, snap-out relationship. In order to enhance retention of the fastener profiles against opening due to pressures exerted from within the bag, the male profile arrow arm which is at the inner side of the bag is larger and angled to cooperate with the complementary portion of the female profile 82 to effect a stronger retaining interlock than the opposite or outer side arrowhead arm of the male profile. Thus, while it is relatively easy to open the bag by pulling on the pull flanges 92, substantially greater interlock retaining coupling of the profiles at the inner side avoids unintentional opening of the fastener.

In all forms of the bags made by practice of the method of the present invention, the bags are provided with folded integral laminar pull flanges at the mouth ends of the bags, with a tucked in gusset initially sealing the mouth end of the bag and after opening of the bags serving as pouring spout means if desired. The bags are in every instance reclosable by means of the resiliently flexible integral separable fastener in the vicinity of the mouth end gusset.

It will be understood that variations and modifications may be effected without departing from the spirit and scope of the novel concepts of this invention.

I claim as my invention:

1. A method of making an integral extruded plastic bag, comprising:

forming a thin wall extruded flexible plastic web;

providing integrally on the plastic web longitudinally extending and laterally spaced complementary resiliently flexible interlocking fastener profiles having an imperforate gusset-forming web area therebetween;

collapsibly folding the gusset-forming web area into a gusset extending in one direction away from said profiles;

folding portions of the plastic web into free terminal digitally manipulatable bag mouth pull flanges projecting to a suitable length in the opposite direction from said profiles;

collapsing the remainder of the plastic web into bag side wall panels toward said gusset and to extend to a substantially greater length than the gusset for providing a substantial bag pouch into which the gusset projects only a limited distance;

and securing the fastener profiles together into interlocking but releasable fastener relation;

whereby the gusset provides a security closure for the bag which closure is adapted to be broken for discharging contents from the bag and the separable fastener profiles being than adapted for reclosing the bag.

2. A method according to claim 1, comprising folding-in the gusset areas of the plastic web below the fastener profiles.

3. A method according to claim 2, which comprises placing said fastener profiles on the plastic web so close to one another that when said profiles are secured together into interlocking relation the folded portion of the gusset inwardly from the profiles provides a narrow security closure web.

4. A method according to claim 1, comprising providing said fastener profiles on the plastic web in substantially spaced relation, and infolding the area of the plastic web below the profiles into a gusset extending a substantially distance into the bag and adapted to be withdrawn between the separated fastener profiles and thereby forming a pouring spout.

5. A method according to claim 4, comprising heat sealing said gusset into a pouring spout funnel of substantially triangular form.

6. A method according to claim 1, comprising initially extending the gusset to project in said one direction from said profiles, and extending all of the remainder of the plastic web to project in the opposite direction from said profiles, heat sealing said gusset to provide a substantially triangular funnel element shape, then folding said remainder of the plastic web into said free terminal pull flanges and bag side wall panels with the funnel element enveloped between said side wall panels.

7. A method according to claim 1, comprising effecting infolding of the gusset by running the flexible plastic web along an infolding member, and guiding said profiles in grooves in said infolding member.

8. A method according to claim 7, including effecting collapsing of the remainder of the plastic web by running the web and the infolded gusset through the nip of pinch rolls.

9. A method according to claim 1, which comprises running folded upper end portions of the gusset and adjacent upper end portions of the side wall panels between squeeze rolls and a presser pad guide block, and guiding the profiles along grooves in the block.

10. A method according to claim 9, comprising running the collapsed assembly beyond the squeeze rolls and presser guide block between joining rolls and thereby securing the fastener profiles together into interlocking fastener relation.

11. A method according to claim 10, comprising subjecting the folded pull flange portions to thermal bonding.

12. A method according to claim 1, comprising bonding said folded pull flange portions together.

13. A method according to claim 12, which comprises applying heated air to said pull flange portions to effect said bonding.

14. A method of making an integral extruded plastic bag, comprising:

forming a thin wall extruded flexible plastic web;

providing integrally on the plastic web longitudinally extending and laterally spaced complementary resiliently flexible interlocking fastener profiles having an imperforate gusset-forming web area therebetween;

collapsibly folding the gusset-forming web area into free terminal digitally manipulatable bag mouth pull flanges projecting to a substantial length away from said profiles and also in part folding said area into a gusset extending inwardly toward said profiles between said pull flanges;

securing said fastener profiles together into interlocking but releasable fastener relation;

and collapsing the remainder of the plastic web into bag side wall panels facing toward one another and extending to a substantial length away from said profiles and in the opposite direction from said pull flanges for providing a substantial bag pouch;

whereby the gusset provides a security closure for the bag which closure is adapted to be broken and the fastener profiles separated for discharging contents from the bag and the separable fastener profiles being then adapted for reclosing the bag.

15. A method of making an integral extruded plastic bag comprising:

forming a thin wall extruded flexible plastic web as a tubular extrusion, with flexible interlocking fastener profiles formed as integral extrusions on the inside of said tubular extrusion;

collapsing the tubular extrusion and thereby securing the fastener profiles together whereby a collapsed gusset-forming web area extends in one direction from said profiles and the remainder of the plastic web extends in the opposite direction from the profiles;

splitting said remainder of the plastic web into two panels;

and folding said panels toward said collapsed gusset-forming web area and thereby forming portions of the plastic web into free terminal digitally manipulatable bag mouth pull flanges and providing side wall panels for a bag pouch.

16. A method according to claim 15, comprising bonding said folded pull flange portions together.

17. A method according to claim 16, which comprises applying heated air to said pull flange portions to effect said bonding.

* * * * *

UNITED STATES PATENT AND TRADEMARK OFFICE

CERTIFICATE OF CORRECTION

PATENT NO. : 4,235,653

DATED : November 25, 1980

INVENTOR(S) : Steven Ausnit

It is certified that error appears in the above—identified patent and that said Letters Patent is hereby corrected as shown below:

[63] delete ", abandoned".
column 8, line 8, "thermosplastic" read
--thermoplastic--
column 10, line 26, for "than" read --then--
column 10, line 40, for "substantially" read
--substantial--.

Signed and Sealed this

*Twenty-fourth* Day of *March 1981*

[SEAL]

*Attest:*

RENE D. TEGTMEYER

*Attesting Officer* *Acting Commissioner of Patents and Trademarks*